United States Patent
McGrogan et al.

(10) Patent No.: US 8,892,317 B2
(45) Date of Patent: Nov. 18, 2014

(54) METHOD AND APPARATUS FOR MANAGING SPEEDS IN A MULTI-MODE TRANSMISSION

(71) Applicant: GM Global Technology Operations LLC, Detroit, MI (US)

(72) Inventors: Sean W. McGrogan, Ann Arbor, MI (US); Anthony H. Heap, Ann Arbor, MI (US); Lawrence A. Kaminsky, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 85 days.

(21) Appl. No.: 13/780,667

(22) Filed: Feb. 28, 2013

(65) Prior Publication Data

US 2014/0244119 A1 Aug. 28, 2014

(51) Int. Cl.
*B60W 10/02* (2006.01)
*B60W 10/11* (2012.01)
*B60W 10/06* (2006.01)
*B60W 10/20* (2006.01)

(52) U.S. Cl.
CPC .............. *B60W 10/11* (2013.01); *B60W 10/06* (2013.01); *B60W 10/20* (2013.01)
USPC .............................. 701/54; 701/102; 701/110

(58) Field of Classification Search
CPC ..... B60W 10/00; B60W 10/06; B60W 10/08; B60W 10/02; B60W 10/11; B60W 20/00; B60W 20/10
USPC ......... 701/51, 54, 70, 121, 79, 22, 69, 84, 80, 701/67, 99, 101, 110, 102; 477/3, 5, 6, 7; 180/65.21, 65.23, 65.29, 65.225
See application file for complete search history.

(56) References Cited

U.S. PATENT DOCUMENTS

| | | | | |
|---|---|---|---|---|
| 8,214,093 B2 * | 7/2012 | Heap et al. | ...................... | 701/22 |
| 8,290,681 B2 * | 10/2012 | Kaminsky et al. | .............. | 701/99 |
| 8,489,293 B2 * | 7/2013 | Heap et al. | ...................... | 701/54 |

* cited by examiner

*Primary Examiner* — Richard Camby

(57) ABSTRACT

A multi-mode powertrain system includes a transmission configured to transfer torque among an internal combustion engine, torque machines and an output member. A method for controlling the powertrain system includes determining a desired acceleration profile for the internal combustion engine, determining a constrained acceleration profile by imposing prioritized constraints on the desired acceleration profile, integrating the constrained acceleration profile to determine a preferred speed profile, determining a preferred acceleration profile including a derivative of the preferred speed profile constrained by minimum and maximum hard acceleration constraints, and controlling operation of the internal combustion engine in response to the preferred acceleration profile and the preferred speed profile.

17 Claims, 3 Drawing Sheets

METHOD AND APPARATUS FOR MANAGING SPEEDS IN A MULTI-MODE TRANSMISSION

TECHNICAL FIELD

This disclosure is related to powertrain systems employing torque transmission devices, and dynamic system controls associated therewith.

BACKGROUND

The statements in this section merely provide background information related to the present disclosure. Accordingly, such statements are not intended to constitute an admission of prior art.

Known powertrain systems are configured to transfer torque from a torque actuator through a transmission device to an output member coupled to a driveline to effect propulsion of a vehicle. A powertrain system may be configured to transfer torque originating from multiple torque actuators through a multi-mode transmission device to an output member coupled to a driveline to effect propulsion. Such powertrain systems include hybrid powertrain systems and extended-range electric vehicle systems. Control systems for operating such powertrain systems operate the torque actuators and apply selected torque transfer elements in the transmission to transfer torque in response to operator-commanded output torque requests, taking into account fuel economy, emissions, driveability, and other factors. Exemplary torque actuators include internal combustion engines and non-combustion torque machines. The non-combustion torque machines may include electric machines that operate as motors or generators to generate torque input to the transmission independently of torque input from the internal combustion engine. The torque machines may react torque, i.e., transform vehicle kinetic energy transferred through the vehicle driveline to electrical energy that is storable in an electrical energy storage device in what is referred to as a regenerative operation. A control system monitors inputs from the vehicle and the operator and provides operational control of the powertrain, including controlling an engine on/off state, controlling a transmission operating state, controlling the torque actuators, and regulating electrical power flow between the electrical energy storage device and the electric machines to manage transmission operation including torque and rotational speed.

SUMMARY

A multi-mode powertrain system includes a transmission configured to transfer torque among an internal combustion engine, torque machines and an output member. A method for controlling the powertrain system includes determining a desired acceleration profile for the internal combustion engine, determining a constrained acceleration profile by imposing prioritized constraints on the desired acceleration profile, integrating the constrained acceleration profile to determine a preferred speed profile, determining a preferred acceleration profile including a derivative of the preferred speed profile constrained by minimum and maximum hard acceleration constraints, and controlling operation of the internal combustion engine in response to the preferred acceleration profile and the preferred speed profile.

BRIEF DESCRIPTION OF THE DRAWINGS

One or more embodiments will now be described, by way of example, with reference to the accompanying drawings, in which.

DETAILED DESCRIPTION

Figure 1:
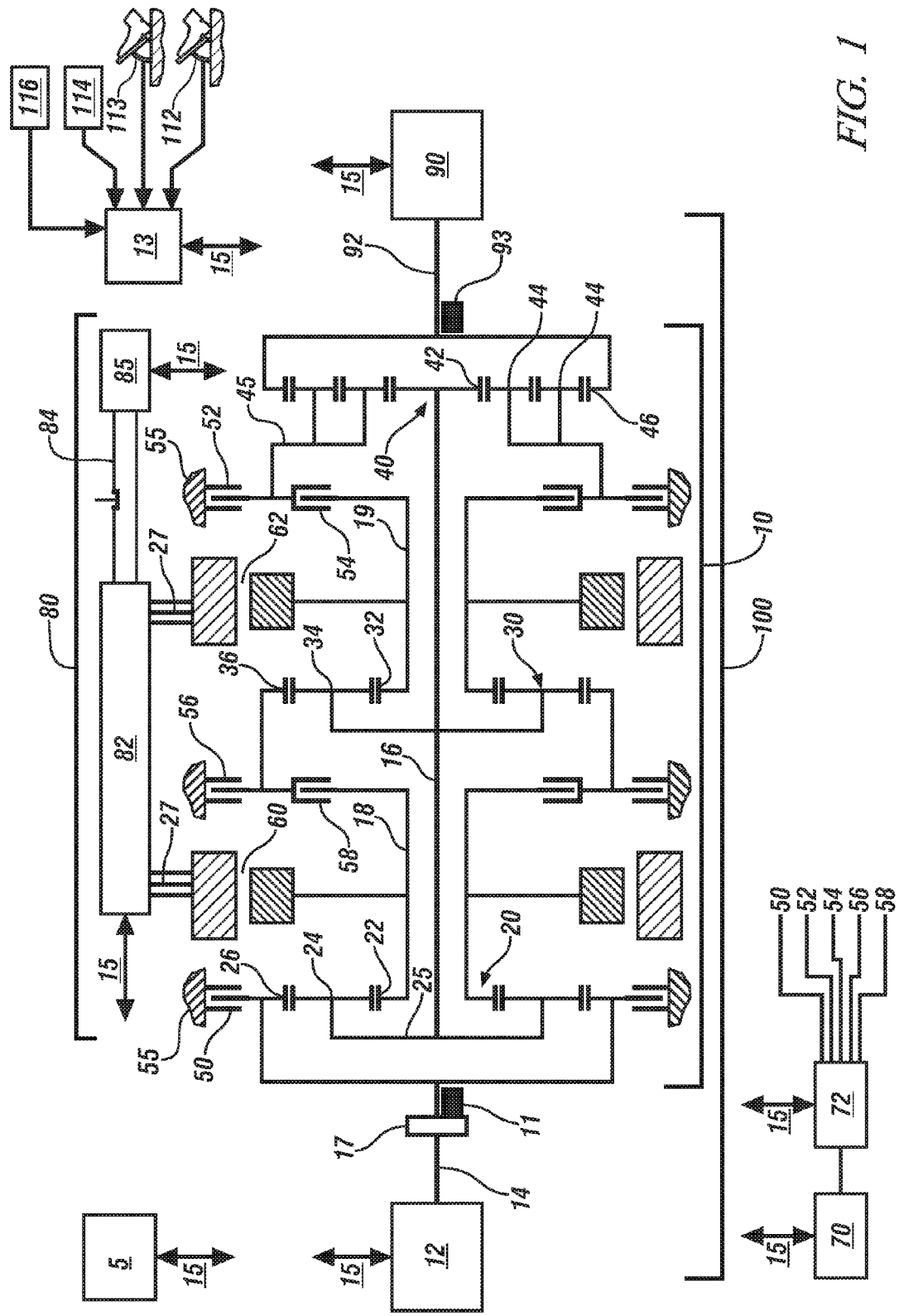
FIG. 1 illustrates a powertrain system including torque actuators, a multi-mode transmission, a high-voltage electrical system, a driveline, and a controller, in accordance with the disclosure.

Referring now to the drawings, wherein the showings are for the purpose of illustrating certain exemplary embodiments only and not for the purpose of limiting the same, FIG. 1 depicts a non-limiting hybrid powertrain system 100 including torque actuators including an internal combustion engine (engine) 12 and first and second torque machines 60 and 62, respectively, a multi-mode transmission (transmission) 10, a high-voltage electrical system 80, a driveline 90, and a controller 5. The transmission 10 mechanically couples to the engine 12 and the torque machines 60, 62, and is configured to transfer torque between the engine 12, the torque machines 60, 62, and the driveline 90 through selective activation of torque transfer devices, e.g., clutches. As illustrated, the first and second torque machines 60, 62 are electric motor/generators.

The high-voltage electrical system 80 includes an electrical energy storage device (ESD) 85 electrically coupled to a transmission power inverter control module (TPIM) 82 via a high-voltage electrical bus 84, and is configured with suitable devices for monitoring electric power flow including devices and systems for monitoring electric current and voltage. The ESD 85 can be any suitable high-voltage electrical energy storage device, e.g., a high-voltage battery, and preferably includes a monitoring system that provides a measure of electrical power supplied to the high-voltage bus electrical 84, including voltage and electric current.

The engine 12 includes a multi-cylinder internal combustion engine selectively operative in several states to transfer torque to the transmission 10 via an input member 14 and damper 17, and can be either a spark-ignition or a compression-ignition engine. The engine 12 includes a crankshaft coupled to the input member 14 of the transmission 10. A rotational speed sensor 11 monitors crank angle and rotational speed of the input member 14. The damper 17 is a device configured to damp and otherwise manage torque transfer between the engine 12 and the transmission 10. Power output from the engine 12, i.e., rotational speed multiplied by engine torque, can differ from the input speed and the input torque to the transmission 10 due to the torque damper 17 and other torque-consuming components on the input member 14 between the engine 12 and the transmission 10, e.g., a mechanically-powered hydraulic pump. The engine 12 is configured to execute autostop and autostart operations during ongoing powertrain operation in response to operating conditions. The controller 5 is configured to control actuators of the engine 12 to control combustion parameters including intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled by controlling combustion parameters including airflow torque and spark induced torque. Engine speed may also be controlled by controlling reaction torque at the input member 14 by controlling motor torques of first and second torque machines 60 and 62.

Transmission 10 is a four-mode, compound-split, electro-mechanical transmission 10 that includes three planetary-gear sets 20, 30, and 40, and five engageable torque transfer devices, i.e., clutches C1 52, C2 54, C3 56, C4 58, and C5 50. Other embodiments of the transmission are contemplated. The transmission 10 couples to first and second torque machines 60 and 62, respectively. The transmission 10 is configured to transfer torque between the engine 12, the torque machines 60, 62, and the output member 92 in response to an output torque request. The first and second torque machines 60, 62 in one embodiment are motor/generators that employ electric energy to generate and react torque. The planetary gear set 20 includes a sun gear member 22, a ring gear member 26, and planet gears 24 coupled to a carrier member 25. The carrier member 25 rotatably supports the planet gears 24 that are disposed in meshing relationship with both the sun gear member 22 and the ring gear member 26, and couples to rotatable shaft member 16. The planetary gear set 30 includes a sun gear member 32, a ring gear member 36, and planet gears 34 coupled to a carrier member 35. The planet gears 34 are disposed in meshing relationship with both the sun gear member 32 and the ring gear member 36. The carrier member 35 couples to the rotatable shaft member 16. The planetary gear set 40 includes a sun gear member 42, a ring gear member 46, and planet gears 44 coupled to a carrier member 45. As shown, there are first and second sets of planet gears 44 coupled to the carrier member 45. Thus, the planetary gear set 40 is a compound, sun gear member-pinion gear-pinion gear-ring gear member gear set. The carrier member 45 rotatably couples between clutches C1 52 and C2 54. The sun gear member 42 rotatably couples to the rotatable shaft member 16. The ring gear member 46 rotatably couples to the output member 92.

As used herein, clutches refer to torque transfer devices that can be selectively applied in response to a control signal, and may be any suitable devices including by way of example single or compound plate clutches or packs, one-way clutches, and band clutches. A hydraulic circuit 72 is configured to control clutch states of each of the clutches, with pressurized hydraulic fluid supplied by an electrically-powered hydraulic pump 70 that is operatively controlled by the controller 5. Clutches C2 54 and C4 58 are hydraulically-applied rotating friction clutches. Clutches C1 52, C3 56, and C5 50 are hydraulically-controlled brake devices that can be grounded to a transmission case 55. Each of the clutches C1 52, C2 54, C3 56, and C4 58 is hydraulically applied using pressurized hydraulic fluid supplied by the hydraulic control circuit 72 in this embodiment. The hydraulic circuit 72 is operatively controlled by the controller 5 to activate and deactivate the aforementioned clutches, provide hydraulic fluid for cooling and lubricating elements of the transmission, and provide hydraulic fluid for cooling the first and second torque machines 60 and 62. Hydraulic pressure in the hydraulic circuit 72 may be determined by measurement using pressure sensor(s), by estimation using on-board routines, or using other suitable methods.

The first and second torque machines 60 and 62 are three-phase AC motor/generator machines, each including a stator, a rotor, and a resolver. The motor stator for each of the torque machines 60, 62 is grounded to an outer portion of the transmission case 55, and includes a stator core with coiled electrical windings extending therefrom. The rotor for the first torque machine 60 is supported on a hub plate gear that mechanically attaches to sleeve shaft 18 that couples to the first planetary gear set 20. The rotor for the second torque machine 62 is fixedly attached to sleeve shaft hub 19 that mechanically attaches to the second planetary gear 30. Each of the resolvers is signally and operatively connected to the transmission power inverter control module (TPIM) 82, and each senses and monitors rotational position of the resolver rotor relative to the resolver stator, thus monitoring rotational position of respective ones of first and second torque machines 60 and 62. Additionally, the signals output from the resolvers may be used to determine rotational speeds for first and second torque machines 60 and 62.

The output member 92 of the transmission 10 is rotatably connected to the driveline 90 to provide output power to the driveline 90 that is transferred to one or a plurality of vehicle wheels via differential gearing or a transaxle or another suitable device. The output power at the output member 92 is characterized in terms of an output rotational speed and an output torque. A transmission output speed sensor 93 monitors rotational speed and rotational direction of the output member 92. Each of the vehicle wheels is preferably equipped with a sensor configured to monitor wheel speed to determine vehicle speed, and absolute and relative wheel speeds for braking control, traction control, and vehicle acceleration management.

The input torque from the engine 12 and the motor torques from the first and second torque machines 60 and 62 are generated as a result of energy conversion from fuel or electrical potential stored in the electrical energy storage device (ESD) 85. The ESD 85 is high voltage DC-coupled to the TPIM 82 via the high-voltage electrical bus 84 that preferably include a contactor switch that permits or prohibits flow of electric current between the ESD 85 and the TPIM 82. The TPIM 82 preferably includes a pair of power inverters and respective motor control modules configured to receive torque commands and control inverter states therefrom for providing motor drive or regeneration functionality to meet the motor torque commands. The power inverters include complementary three-phase power electronics devices, and each includes a plurality of insulated gate bipolar transistors for converting DC power from the ESD 85 to AC power for powering respective ones of the first and second torque machines 60 and 62, by switching at high frequencies. The insulated gate bipolar transistors form a switch mode power supply configured to receive control commands. Each phase of each of the three-phase electric machines includes a pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second torque machines 60 and 62 for operation as motors or generators via transfer conductors. The TPIM 82 transfers electrical power to and from the first and second torque machines 60 and 62 through the power inverters and respective motor control modules in response to the motor torque commands. Electrical current is transmitted across the high-voltage electrical bus 84 to and from the ESD 85 to charge and discharge the ESD 85.

The controller 5 signally and operatively links to various actuators and sensors in the powertrain system via a communications link 15 to monitor and control operation of the powertrain system, including synthesizing information and inputs, and executing routines to control actuators to meet control objectives related to fuel economy, emissions, performance, drivability, and protection of hardware, including batteries of ESD 85 and the first and second torque machines 60 and 62. The controller 5 is a subset of an overall vehicle control architecture, and provides coordinated system control of the powertrain system. The controller 5 may include a distributed control module system that includes individual control modules including a supervisory control module, an engine control module, a transmission control module, a battery pack control module, and the TPIM 82. A user interface 13 is preferably signally connected to a plurality of devices through which a vehicle operator directs and commands operation of the powertrain system. The devices preferably include an accelerator pedal 112, an operator brake pedal 113, a transmission range selector 114 (PRNDL), and a vehicle speed cruise control system 116. The transmission range selector 114 may have a discrete number of operator-selectable positions, including indicating direction of operator-intended motion of the vehicle, and thus indicating the preferred rotational direction of the output member 92 of either a forward or a reverse direction. It is appreciated that the vehicle may still move in a direction other than the indicated direction of operator-intended motion due to rollback caused by location of a vehicle, e.g., on a hill. The user interface 13 may include a single device, as shown, or alternatively may include a plurality of user interface devices directly connected to individual control modules.

The aforementioned control modules communicate with other control modules, sensors, and actuators via the communications link 15, which effects structured communication between the various control modules. The specific communication protocol is application-specific. The communications link 15 and appropriate protocols provide for robust messaging and multi-control module interfacing between the aforementioned control modules and other control modules providing functionality including e.g., antilock braking, traction control, and vehicle stability. Multiple communications buses may be used to improve communications speed and provide some level of signal redundancy and integrity, including direct links and serial peripheral interface (SPI) buses. Communication between individual control modules may also be effected using a wireless link, e.g., a short range wireless radio communications bus. Individual devices may also be directly connected.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, to monitor inputs from sensing devices and other networked control modules and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The hybrid powertrain system 100 is configured to operate in one of a plurality of powertrain states, including a plurality of engine states and transmission ranges to generate and transfer torque to the driveline 90. The engine states include an ON state and an OFF state. The engine 12 is considered to be in the ON state when the engine is spinning. The engine ON state may include an all-cylinder state (ALL) wherein all cylinders are fueled and firing to generate torque, and a cylinder-deactivation state (DEAC) wherein a portion of the cylinders are fueled and firing to generate torque and the remaining cylinders are unfueled, not firing, and not generating torque. The engine ON state further includes a fuel cutoff (FCO) state, wherein all of the cylinders are unfueled, not firing, and not generating torque. The engine 12 can operate in the FCO state in response to an operator command for vehicle deceleration, such as occurs when the operator lifts their foot from the accelerator pedal 112, referred to herein as a decel-fuel cutoff state (dFCO). The engine 12 can be commanded to operate in the FCO state under non-deceleration operating conditions. When the engine is in the OFF state, it is not spinning. In one embodiment, operating with the engine in the OFF state can be accomplished by grounding rotation of the input member to the transmission case using a clutch or similar device. The transmission ranges include a plurality of neutral (neutral), fixed gear (Gear #), variable mode (EVT Mode #), electric vehicle (EV#) and transitional (EV Transitional Range# and Pseudo-gear #) ranges that are achieved by selectively activating the clutches C1 150, C2 152, C3 154, C4 156, and C5 158. A pseudo-gear range is a variable mode transmission range in which torque output from the transmission 10 corresponds to the input torque from the engine 12, taking into account torque losses associated with torque-consuming components on the input member 14. The pseudo-gear ranges can be employed as intermediate transmission ranges during shifts between EVT Mode ranges. Table 1 depicts a plurality of transmission ranges and engine states for operating the hybrid powertrain system 100.

TABLE 1

| Range | Engine State | C1 | C2 | C3 | C4 | C5 |
|---|---|---|---|---|---|---|
| Neutral 1 | ON/OFF | | | | | |
| Neutral 2 | ON/OFF | | | x | | |
| Neutral 3 | ON/OFF | | | | x | |
| PseudoGear 1 | ON | x | | | | |
| PseudoGear 2 | ON | | x | | | |
| Neutral | OFF | | | | | x |
| EVT Mode 1 | ON/OFF | x | | x | | |
| EVT Mode 2 | ON/OFF | x | | | x | |
| EVT Mode 3 | ON/OFF | | x | | x | |
| EVT Mode 4 | ON/OFF | | x | x | | |
| EV Transitional State 1 | OFF | x | | | | x |
| EV Transitional State 2 | OFF | | x | | | x |
| Gear 1 | ON | | | x | x | |
| Gear 2 | ON | x | x | | x | |
| Gear 3 | ON | | x | x | x | |
| EV1 | OFF | x | | x | | x |
| EV2 | OFF | x | | | x | x |
| EV3 | OFF | | x | | x | x |
| EV4 | OFF | | x | x | | x |
| EV Transitional State 3 | OFF | x | x | | | x |
| Neutral | ON/OFF | | | x | x | |
| PseudoGear 3 | ON | x | x | | | |
| Neutral | OFF | | | x | | x |
| Neutral | OFF | | | | x | x |

Figure 2:
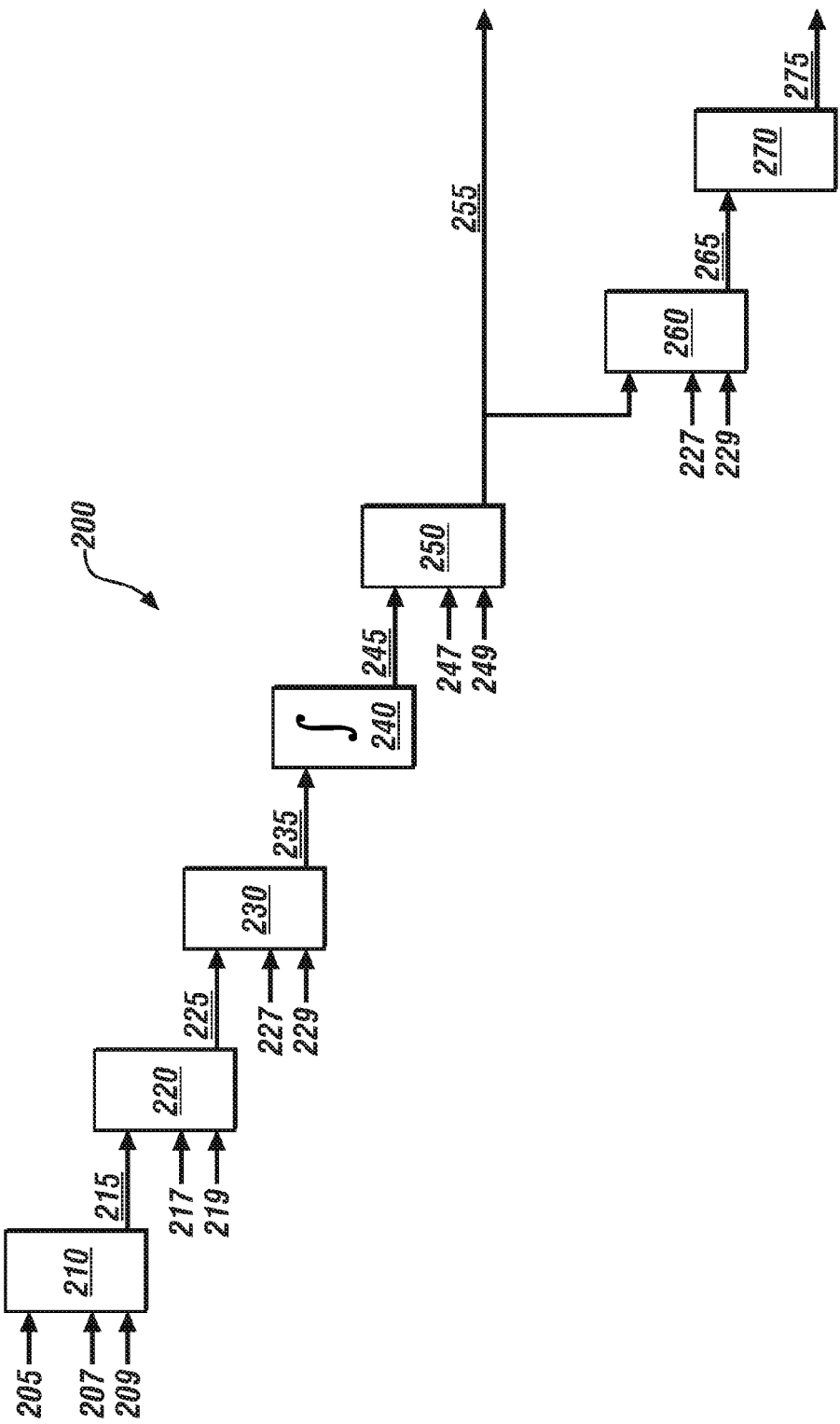
FIG. 2 illustrates a control scheme including a tiered ascending priority structure for employing preferred speed and acceleration profiles in controlling a torque actuator of a powertrain system, in accordance with the disclosure.
Figure 3:
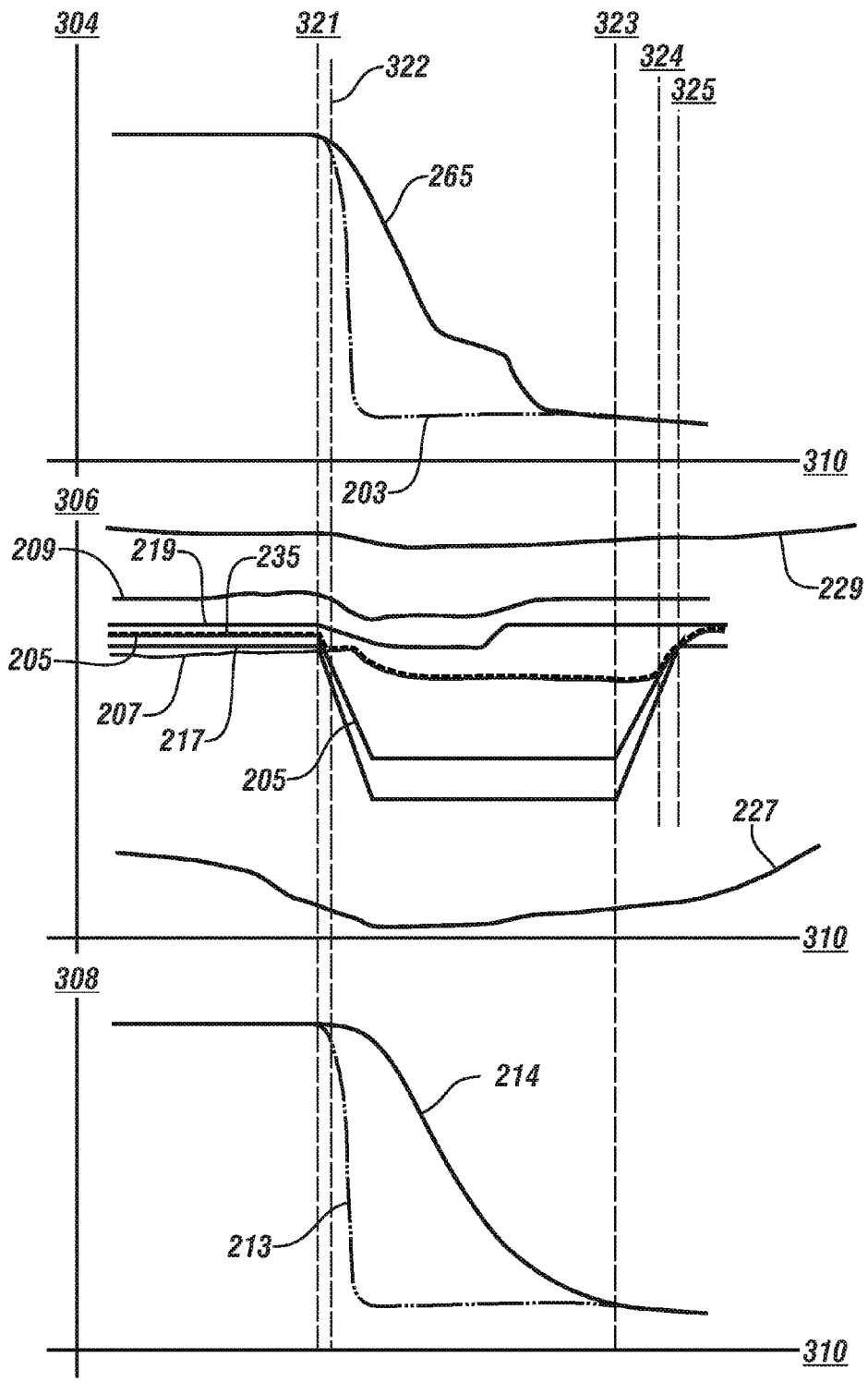
FIG. 3 illustrates speed and acceleration constraints in relation to time for a hybrid powertrain system employing the control scheme including the tiered ascending priority structure of FIG. 2, in accordance with the disclosure.

FIG. 2 schematically shows an embodiment of a control scheme 200 including a tiered ascending priority structure for employing speed and acceleration profiles in controlling a torque actuator of a hybrid powertrain system. The control scheme 200 is described with reference to an embodiment of the hybrid powertrain system 100 of FIG. 1, and may be employed on any suitable powertrain. FIG. 3 graphically shows speed and acceleration constraints in relation to time for a hybrid powertrain system employing the control scheme 200 including the tiered ascending priority structure.

A speed profile is a numerical projection over time that describes a preferred or desired speed for an actively controlled element, i.e., a torque actuator. As applied to the embodiment of the hybrid powertrain system 100 of FIG. 1, a speed profile may be a numerical projection over time of speed of one of the input member 14, the output member 92, first torque machine 60, second torque machine 62, or one of the clutches C1 52, C2 54, C3 56, C4 58, and C5 50. An acceleration profile is a numerical projection over time that describes a preferred or desired time-rate change in speed for one of the aforementioned elements. The speed and acceleration profiles are employed to control the engine 12, the first torque machine 60, the second torque machine 62, and the clutches C1 52, C2 54, C3 56, C4 58, and C5 50, including controlling one of the aforementioned elements to achieve a preferred speed and a preferred acceleration during engine autostart and autostop operations. This may include controlling one of the aforementioned elements to achieve preferred speeds to synchronize elements of one of the clutches C1 52, C2 54, C3 56, C4 58, and C5 50 during a shift change.

The output torque and power capacities of the engine 12 and the first and second torque machines 60 and 62 are finite, and thus magnitude and changes in the output speeds and accelerations thereof are also limited. One factor affecting the output speeds and accelerations includes power limits based upon voltage limits and/or current limits associated with the high-voltage electrical system 80 including the ESD 85. Other factors include minimum and maximum speed limits associated with the first and second torque machines 60 and 62 and clutch limits associated with applied or applying one or more of the clutches C1 52, C2 54, C3 56, C4 58, and C5 50. Another system limitation includes speed-based acceleration limitations associated with output torque, i.e., limits that cause a driver-perceptible change in output torque that is greater than a threshold, e.g., exceeds 0.2 g. Another system limitation includes a speed and acceleration limitation to avoid spinning the engine backwards. Another system limitation includes a speed and acceleration limitation to avoid overspeeding any component of the engine or transmission. Another system limitation includes a time limitation to minimize an amount of time the engine spins in a torque damper resonance zone, e.g., in an engine speed at or near 300 RPM in one embodiment. The aforementioned system limitations may conflict with each other and may not be coincidentally achievable. Thus, the system limitations are applied in a predetermined hierarchy to arbitrate between an ideal acceleration and constraints imposed by the system limitations.

The tiered ascending priority structure of the control scheme 200 is employed to arbitrate between the ideal speed and speed and acceleration constraints imposed by the system limitations. Desired acceleration profile 205 is a calibrated, unconstrained speed profile associated with one of the actively controlled elements, e.g., input speed Ni. Constraints are calculated, including minimum and maximum soft acceleration constraints 207 and 209, respectively, minimum and maximum acceleration directionality constraints 217 and 219, respectively, and minimum and maximum hard acceleration constraints 227 and 229, respectively. The minimum and maximum soft acceleration constraints 207 and 209 include constraints on speed ranges associated with an output torque range and a locked clutch capacity. Exemplary applications of soft acceleration constraints include constraints to prevent excess engine speed sag, constraints to prevent excess engine operating time within the torque damper resonance zone during engine autostart and engine autostop operations and during operation in an FCO state, and constraints to limit excess engine flare speed during engine autostart operations. Each of the soft acceleration constraints are calibratable states that are determined using direct measurement, analytical models, estimations, and subjective evaluations and/or other methods to identify thresholds in terms of maximum allowable times (e.g., in seconds), maximum allowable time-rate changes in engine speed or maximum (or minimum) allowable engine speeds. The minimum and maximum hard acceleration constraints 227 and 229 are associated with ensuring that battery power limits and motor torque limits are met, without regard to the effect on the output speed. The minimum and maximum hard acceleration constraints 227 and 229 are related to the minimum and maximum soft acceleration constraints 207 and 209 without consideration for the output speed range and locked clutch capacity range, while considering battery power corresponding to voltage and current limits. Thus, the hard acceleration constraints are generally broader than the soft acceleration constraints.

Limit module 210 applies the minimum and maximum soft acceleration constraints 207 and 209 to the desired acceleration profile 205 to achieve a soft-limited speed profile 215. The soft-limited speed profile 215 is subjected to minimum and maximum acceleration directionality constraints 217 and 219, respectively, by limit module 220 to achieve a direction-constrained soft-limited speed profile 225. The minimum and maximum acceleration directionality constraints 217 and 219 indicate a range of accelerations that the system desires to satisfy, and includes a limit on the magnitude of change induced by the minimum and maximum soft acceleration constraints 207 and 209. For example, during engine autostart and autostop maneuvers, the minimum and maximum soft acceleration constraints 207 and 209 may limit a time-rate change in engine speed, thus causing the engine to operate in a speed zone associated with the torque damper resonance zone for a period of time that is unacceptable in terms of operator perception. Furthermore, in one embodiment the operating system preferably manages and accounts for engine speed flare occurring during engine autostart operation without implementing operating schemes that attempt to suppress the speed flare. Thus, the minimum and maximum acceleration directionality constraints 217 and 219 are applied to the soft-limited speed profile 215 to prevent inducing operation in the torque damper resonance zone for an extended period of time.

Limit module 230 subjects the direction-constrained soft-limited speed profile 225 to the minimum and maximum hard acceleration constraints 227 and 229, thus generating an intermediate acceleration profile 235. The powertrain system is physically incapable of operating outside the hard acceleration constraints, and thus this operation ensures that the control scheme generates speed and acceleration commands that are within the capability of the powertrain system. Absent such limitations as the minimum and maximum hard acceleration constraints 227 and 229, the control scheme may generate torque commands that attempt to compel the powertrain system to achieve an infeasible commanded acceleration, with a potential result that motor speed limits may be violated and thus cause physical damage that reduces service life of one of the components of the powertrain system.

Integration module 240 is employed to time-integrate the intermediate acceleration profile 235 to determine an intermediate speed profile 245. The intermediate speed profile 245 is subjected to minimum and maximum speed constraints 247 and 249 to generate a preferred speed profile 255. The minimum and maximum speed constraints 247 and 249 are rotational speed constraints that accommodate extremes of acceptable speeds for all the components of the engine, transmission and torque machines. Thus, the preferred speed profile 255 determined in constraint module 250 takes into account the aforementioned torque and speed-based acceleration limitations.

The preferred speed profile 255 is differentiated in differential module 260, and the differentiated preferred speed profile 265 is subjected to the minimum and maximum hard acceleration constraints 227 and 229 in constraint module 270 to determine a preferred acceleration profile 275. The preferred acceleration profile 275 is employed to control operation of the selected torque actuator of the hybrid powertrain system 200.

The control scheme 200 preferably includes executable routines that are deployed in the controller 5 and periodically executed during ongoing operation of the hybrid powertrain system.

FIG. 3 graphically shows data associated with operation of an embodiment of the hybrid powertrain system of FIG. 1 employing the control scheme 200 of FIG. 2, including the tiered ascending priority structure for controlling a torque actuator. As shown, the torque actuator being controlled is an embodiment of the internal combustion engine, and the control parameters include rotational speed and acceleration of the input member from the engine to the multi-mode transmission.

A first portion of the graph includes output torque on the vertical axis 304 in relation to time on the horizontal axis 310. A second portion of the graph includes rotational speeds and accelerations on the vertical axis 306 in relation to time on the horizontal axis 310 coincident with the first graph. A third portion of the graph includes engine torques on the vertical axis 308 in relation to time on the horizontal axis 310 coincident with the first graph. The monitored torque includes an output torque request 203. The acceleration of interest is the desired input acceleration 205, which is subject to constraints including the minimum and maximum soft acceleration constraints 207 and 209, minimum and maximum acceleration directionality constraints 217 and 219, and minimum and maximum hard acceleration constraints 227 and 229 in accordance with the tiered ascending priority structure of the control scheme 200 to achieve the acceleration profile 235. Minimum and maximum speed constraints 247 and 249 are not depicted. The engine torque commands include a desired engine torque request 213 and an engine air torque 214.

Prior to time 321, the desired input acceleration 205 and the acceleration profile 235 are within all the constraints. There is a steep decrease in an output torque request 203 at time 321, with a corresponding decrease in the desired engine torque request 213 and the desired input acceleration 205, which is subjected to the aforementioned minimum and maximum constraints. The acceleration profile 235 decreases in response to the decrease in the desired input acceleration 205. At time 322, the desired input acceleration 205 reaches the minimum soft acceleration constraint 207, thus constraining the acceleration profile 235. At time 323, the engine air torque 214 achieves the desired engine torque request 213, thus causing a change in the desired input acceleration 205, which begins to increase. This also causes changes in the minimum and maximum acceleration directionality constraints 217 and 219. At time 324, the desired input acceleration 205 overtakes the minimum soft acceleration constraint 207, thus constraining it, and causing an increase in the acceleration profile 235. At time 325, the minimum acceleration directionality constraint 217 imposes constraints on the acceleration profile 235, and operation reaches a stasis point again. During this period in this example, the system does not approach the minimum and maximum hard acceleration constraints 227 and 229.

Thus, control of a multi-mode powertrain system is effected that includes determining a desired acceleration profile for an internal combustion engine and determining a constrained acceleration profile by imposing prioritized constraints on the desired acceleration profile. The constrained acceleration profile is integrated to determine a preferred speed profile. A preferred acceleration profile is determined, and includes a derivative of the preferred speed profile that has been constrained by minimum and maximum hard acceleration constraints. Operation of the internal combustion engine can be controlled in response to the preferred acceleration profile and the preferred speed profile.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling a multi-mode powertrain system comprising a transmission configured to transfer torque among an internal combustion engine, torque machines and an output member, the method comprising:
   determining a desired acceleration profile for the internal combustion engine;
   determining a constrained acceleration profile by imposing prioritized constraints on the desired acceleration profile;
   integrating the constrained acceleration profile to determine a preferred speed profile;
   determining a preferred acceleration profile comprising a derivative of the preferred speed profile constrained by minimum and maximum hard acceleration constraints; and
   controlling operation of the internal combustion engine in response to the preferred acceleration profile and the preferred speed profile.

2. The method of claim 1, wherein determining the constrained acceleration profile comprises imposing prioritized constraints on the desired acceleration profile, said prioritized constraints comprising minimum and maximum soft acceleration constraints superseded by minimum and maximum acceleration directionality constraints superseded by minimum and maximum hard acceleration constraints.

3. The method of claim 2, wherein said minimum and maximum soft acceleration constraints comprise constraints on speed ranges associated with an output torque range and locked clutch capacity.

4. The method of claim 3, wherein said constraints on speed ranges associated with the output torque range and locked clutch capacity comprise constraints to prevent engine speed sag greater than a threshold.

5. The method of claim 3, wherein said constraints on speed ranges associated with the output torque range and locked clutch capacity comprise constraints to prevent engine operation within a torque damper resonance zone greater than a threshold period of time during engine autostart and engine autostop operations.

6. The method of claim 3, wherein said constraints on speed ranges associated with the output torque range and locked clutch capacity comprise constraints limiting an engine flare speed to less than a threshold speed during an engine autostart operation.

7. The method of claim 2, wherein said minimum and maximum acceleration directionality constraints comprise constraints to prevent engine operation within a torque damper resonance zone greater than a threshold period of time.

8. The method of claim 2, wherein said minimum and maximum hard acceleration constraints comprise constraints associated with minimum and maximum battery power limits.

9. The method of claim 2, wherein said minimum and maximum hard acceleration constraints comprise constraints associated with minimum and maximum torque capacities of the torque machines.

10. The method of claim 1, wherein controlling operation of the internal combustion engine in response to the preferred acceleration profile and the preferred speed profile comprises controlling operation of the powertrain system in response to the preferred acceleration profile and the preferred speed profile during an engine transition between an engine-on state and an engine-off state.

11. The method of claim 10, wherein controlling operation of the internal combustion engine in response to the preferred acceleration profile and the preferred speed profile during an engine transition between an engine-on state and an engine-off state comprises controlling operation of the internal combustion engine during an engine autostart operation.

12. The method of claim 10, wherein controlling operation of the internal combustion engine in response to the preferred acceleration profile and the preferred speed profile during an engine transition between an engine-on state and an engine-off state comprises controlling operation of the internal combustion engine during an engine autostop operation.

13. A method for controlling an internal combustion engine of a multi-mode powertrain system, comprising:
  determine a preferred speed profile for the internal combustion engine, comprising integrating a desired engine acceleration profile that is constrained by prioritized constraints;
  determining a preferred acceleration profile comprising differentiating the preferred speed profile; and
  controlling operation of the internal combustion engine in response to the preferred speed profile and the preferred acceleration profile.

14. The method of claim 13, wherein said prioritized constraints comprise minimum and maximum soft acceleration constraints superseded by minimum and maximum acceleration directionality constraints superseded by minimum and maximum hard acceleration constraints.

15. The method of claim 13, wherein controlling operation of the internal combustion engine in response to the preferred acceleration profile and the preferred speed profile comprises controlling operation of the internal combustion engine in response to the preferred acceleration profile and the preferred speed profile during an engine transition between an engine-on state and an engine-off state.

16. The method of claim 13, wherein determining the preferred acceleration profile further comprises constraining the differentiated preferred speed profile with minimum and maximum hard acceleration constraints.

17. A method for controlling a hybrid powertrain system including a plurality of torque actuators and a multi-mode transmission, the method comprising:
  determining a desired acceleration profile for one of the torque actuators;
  determining a constrained acceleration profile by imposing prioritized constraints on the desired acceleration profile, said prioritized constraints comprising minimum and maximum soft acceleration constraints superseded by minimum and maximum desired acceleration constraints superseded by minimum and maximum hard acceleration constraints;
  integrating the constrained acceleration profile to determine a preferred speed profile;
  determining a preferred acceleration profile comprising a derivative of the preferred speed profile constrained by said minimum and maximum hard acceleration constraints; and
  controlling operation of the torque actuator in response to the preferred acceleration profile and the preferred speed profile during an engine transition between an engine-on state and an engine-off state.

* * * * *